J. C. CARMODY.
ATTACHMENT FOR AUTOMOBILE CONTROLLING PEDALS.
APPLICATION FILED JULY 10, 1919.
1,342,372.
Patented June 1, 1920.
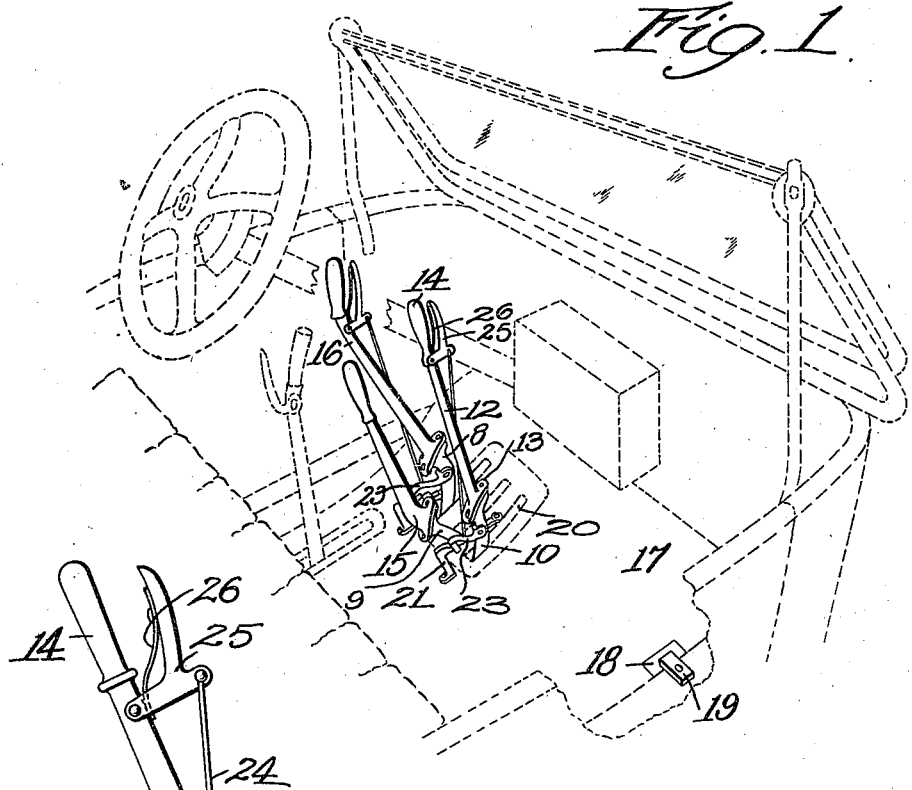
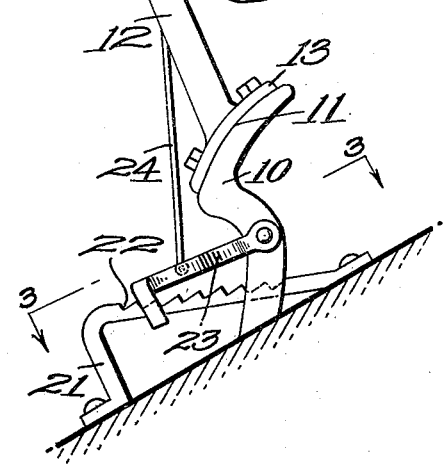
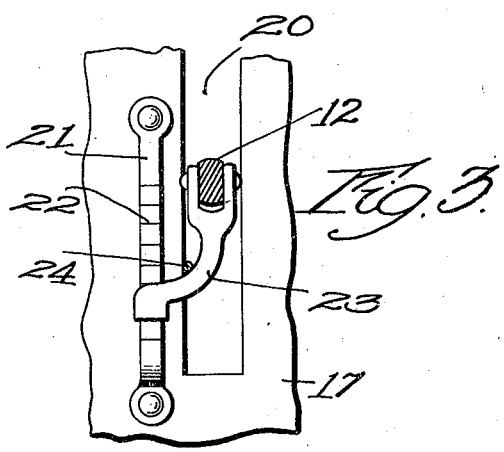
Witness
C. F. Wesson.
Inventor
J. C. Carmody.
By attorneys
Southgate & Southgate

UNITED STATES PATENT OFFICE.

JOHN C. CARMODY, OF FITCHBURG, MASSACHUSETTS.

ATTACHMENT FOR AUTOMOBILE-CONTROLLING PEDALS.

1,342,372.  Specification of Letters Patent.  Patented June 1, 1920.

Application filed July 10, 1919. Serial No. 309,979.

*To all whom it may concern:*

Be it known that I, JOHN C. CARMODY, a citizen of the United States, residing at Fitchburg, in the county of Worcester and State of Massachusetts, have invented a new and useful Attachment for Automobile-Controlling Pedals, of which the following is a specification.

This invention relates to an attachment for automobiles by which those ordinarily designed to be controlled by the feet can be converted readily into a form adapted for hand control, so that a person who is crippled can operate the car and also so that one used to driving a car of the other type can, without much practice, operate a car of the pedal controlled type. Further objects and advantages of the invention will appear hereinafter.

Reference is to be had to the accompanying drawing in which—

Figure 1 is a perspective view of the inside of a Ford car showing a preferred embodiment of this invention applied thereto.

Fig. 2 is a longitudinal sectional view showing one of the attachments on a larger scale, and Fig. 3 is a sectional view on the line 3—3 of Fig. 2.

The invention as shown is applied to a Ford car having the usual foot pedals, 8, 9, and 10 for controlling it. It is unnecessary to describe these in detail as they are well known, and I prefer to apply this invention to all three of them.

The pedal shown in Fig. 2, like the others, has a convex surface 11 which is designed to receive the foot of the operator and through which pressure is imparted to it under ordinary conditions to operate it. It is upon this convex surface that the attachment is applied.

This attachment comprises a bar 12, a plate 13 and a handle 14, all in one piece preferably.

The plate is concave on its lower surface to fit the convex surface of the pedal 10. It is secured directly to the pedal by bolts or in any other desired manner. It is thus rigidly fixed to the pedal and the bar 12 extends from it at any desired angle. In the form shown in Fig. 2 this bar is straight but the other two pedals illustrated conveniently have the bar bent at 15 or 16 as the case may be.

The elements heretofore described may constitute the entire attachment as is the case with one of them as illustrated. But for safety and convenience, particularly if the device is to be used by a crippled person, I provide the floor plate 17 of the car with a metal piece 18 and place a member 19 on a fixed part of the car to project over it so as to hold this floor plate in a fixed position, and near the slot 20 through which the pedal projects, I place a piece of bar iron 21 in fixed position, this being provided with ratchet teeth 22. I pivotally mount a pawl 23 on the pedal 10. This is designed to engage the ratchet teeth and hold the pedal against motion in one direction. For the purpose of lifting this pawl away from the teeth so that the pedal can be moved back, I pivotally connect to it a rod 24 operated by a lever 25 pivoted to the upper end of the bar 12 and provide a spring 26 for normally holding it out in the position shown in Fig. 2. This is located near the handle 14 so that the operator can grasp it and operate it in a convenient manner as is well understood.

It will be seen that by means of such an attachment as I have described, a Ford car can be converted cheaply and conveniently into a hand manipulated car and all the safety means are provided that is necessary in order to keep the control pedals in the positions desired. This is done without modifying the existing parts of the car and leaves them in such shape that if the handles are removed later, the pedals will not be left in such a condition as to make any modification of them necessary and they can be used then in the usual way.

Although I have illustrated and described only a single form of the invention, I am aware of the fact that modifications can be made therein by any person skilled in the art, without departing from the scope of the invention as expressed in the claims. Therefore I do not wish to be limited to all the details of construction herein shown and described, but what I do claim is:—

1. The combination with an automobile control pedal, of a plate having a lower surface fitting the upper surface of the pedal and rigidly secured to it, a handle rigidly connected with said plate and located materially above it for manipulating the pedal, a stationary ratchet adjacent to the pedal, a pawl pivoted to the pedal for coöperation with the ratchet and means connected with the handle for operating the pawl.

2. The combination with a foot pedal for controlling an automobile, of a handle rigidly connected with the plate and located at a distance from it whereby the pedal can be manipulated by the hand without the use of the foot, a floor plate having a slot through which said pedal projects, means on the side of the car for holding said plate down rigidly, a ratchet secured to the said floor plate adjacent to said slot, a pawl pivoted to said pedal projecting therefrom to engage the ratchet, a rod pivoted to the pawl and extending upwardly and spring pressed means pivotally connected with the handle for lifting the pawl.

In testimony whereof I have hereunto affixed my signature.

JOHN C. CARMODY.